United States Patent [19]

Kazakidis

[11] Patent Number: 5,274,969
[45] Date of Patent: Jan. 4, 1994

[54] LANDSCAPE DIVIDER

[76] Inventor: Nicholas Kazakidis, 4648 N. Paulina, Chicago, Ill. 60640

[21] Appl. No.: 760,148

[22] Filed: Sep. 16, 1991

[51] Int. Cl.⁵ .............................................. A01G 1/00
[52] U.S. Cl. ......................................... 52/102; 47/33
[58] Field of Search ................ 52/102; 47/33, 32; 404/6, 7, 8

[56] References Cited

U.S. PATENT DOCUMENTS

| | | | |
|---|---|---|---|
| 3,841,022 | 10/1974 | Thodos | 47/33 |
| 4,281,473 | 8/1981 | Emalfarb et al. | 47/33 |
| 4,644,685 | 2/1987 | Tisbo et al. | 47/33 |
| 4,984,689 | 1/1991 | Emalfarb et al. | 47/33 |
| 5,067,273 | 11/1991 | Richwine | 47/33 |

*Primary Examiner*—Richard E. Chilcot, Jr.
*Assistant Examiner*—Michele A. Van Patten
*Attorney, Agent, or Firm*—Edward D. Gilhooly, Ltd.

[57] ABSTRACT

A landscaping divider having a lower ground insertion section and an upper wall portion having a reinforced section. The reinforced section includes a plurality of raised areas founded in selected patterns. The raised areas form flat exposed surfaces.

5 Claims, 1 Drawing Sheet

LANDSCAPE DIVIDER

BACKGROUND OF THE INVENTION

1. Field of the Invention:

This invention relates in general to dividing structures and more particularly, to landscape dividers for separating adjacent terrain.

2. Summary of the Prior Art

It is a common problem in landscaping and gardening to maintain a suitable and attractive separation between adjacent terrain, such as between lawns and gardens, flower beds or shrubs or between adjacent beds of flowers, vegetables or the like in gardens. It is desirable that vegetation be confined to a particular area to prevent growth between the separated areas. For example, it is important for grass in a lawn not to spread or root into adjacent flower beds or gardens.

In the prior art a landscaping divider is disclosed in U.S. Pat. No. 4,281,473 to Emalfarb et al issued Aug. 4, 1981. The divider disclosed in the foregoing patent employs a corrugated section to strengthen the structure during insertion into the ground and during its role as a landscape barrier. While erected, a divider, such as shown in said Emalfarb et al patent, is subject to forces from the soil, such as during freezing and thawing, and impacts from individuals, lawn mowers, and the like. The divider in the '473 patent to Emalfarb et al using a corrugated cross section is subject to cracking or breakage because of the relatively sharp edges of the reinforcing ribs, is not visually attractive, and is expensive to mold and manufacture. For these reasons, it is desirable to provide improved landscape dividers providing a strong, aesthetically pleasing design that is efficiently manufactured.

SUMMARY OF THE INVENTION

It is an objective of the invention to provide a landscaping divider having increased strength characteristics, a visually pleasing design, and a design capable of economical manufacture. The dividers herein disclosed employ a reinforcing section of improved strength to resist the forces applied on the structure during insertion into the ground and while erected. The reinforcing section resists bending and breakage and eliminates sharp edges that break or crack. The strengthening sections are more easily and economically molded than a corrugated section and provide an enhanced appearance.

DESCRIPTION OF THE PREFERRED EMBODIMENTS

Figure 1:
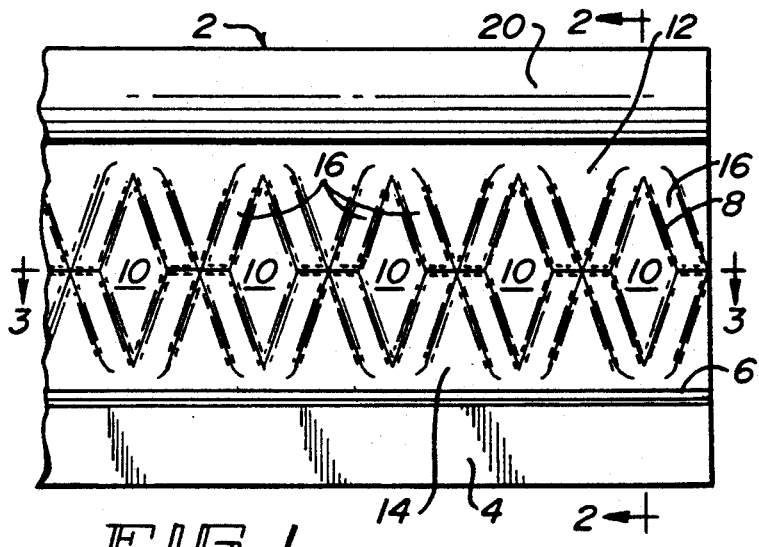
FIG. 1 is a partial front elevational view of a first embodiment of the landscaping divider of the invention.
Figure 2:
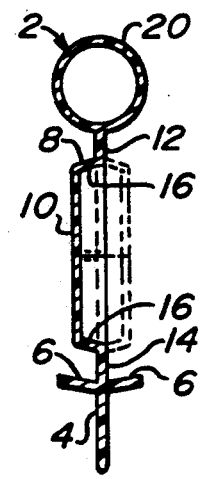
FIG. 2 is an end elevational view, with parts in section, taken along lines 2—2 of FIG. 1.
Figure 3:
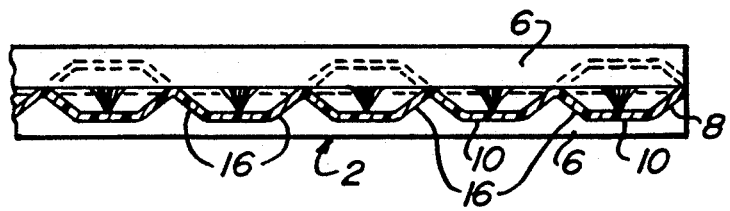
FIG. 3 is top plan view, with parts in section, taken along lines 3—3 of FIG. 1.

Referring now to FIGS. 1-3, there is illustrated a first embodiment of the landscape divider of the invention, generally designated by reference numeral 2. The divider 2 is formed as molded, one piece plastic body which can be formed in a clear color or in variety of attractive colors. For example, the divider 2 may be extruded from a low density polyethylene. Such a material provides a long lifetime of service and is non-toxic. The divider 2 includes a lower vertical flat section 4 that inserted into the ground when the divider 2 is erected. The lower section 4 is generally inserted to a depth in the soil or the like to effect contact between the surface of the ground and a pair of flanges 6 that are flared upward and extend along the length of the divider 2.

The divider 2 further possesses an intermediate strengthening section 8 having a series of protruding sections 10 fabricated in a diamond-like design along the length of divider 2. The protruding section 8 projects outward from upper and lower flat portions 12 and 14 through angled sections 16. The faces 18 of the protruding sections 10 are approximately flat as best seen in FIGS. 2 and 3 and vertically extend substantially the height of the reinforced section. A tube 20 is integrally formed on the top upper section 14 and serves to strengthen the divider 2 and permit attachment between adjacent sections of the divider in use through plug members (not shown) inserted into adjacent tubes 20. The unique diamond design of the strengthening section is relatively economical to mold, eliminates the sharp edges of the corrugation and provides superior strength characteristics.

Figures 4, 5:
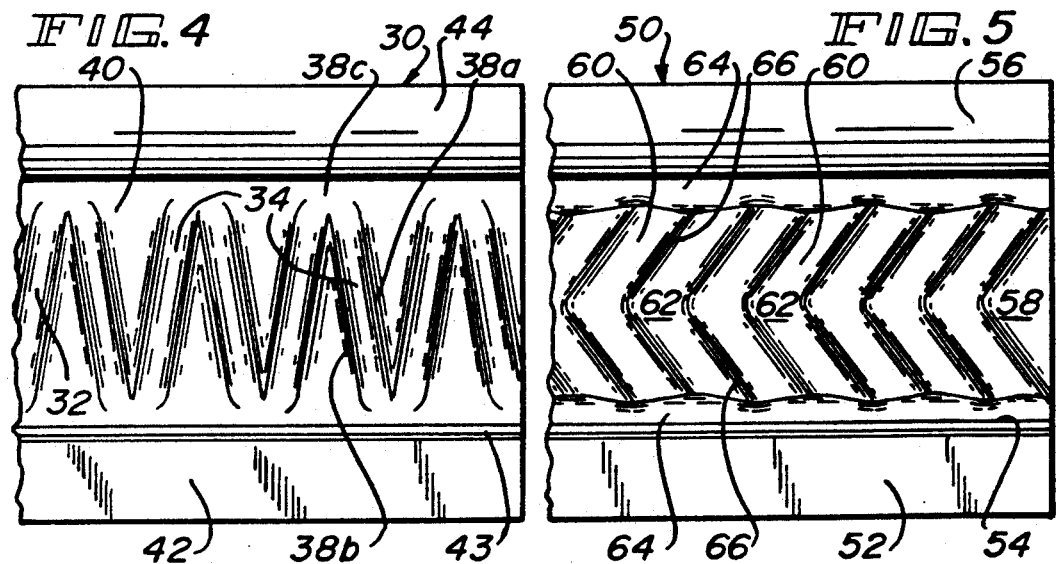
FIG. 4 is a front elevational view of a second embodiment of the landscape divider of the invention.
FIG. 5 is a front elevational view of a third embodiment of the landscape divider of the invention.

Referring to FIG. 5, there is illustrated another embodiment of the invention, generally designated by reference numeral 30. The embodiment of FIG. 4 is similar to the preceding embodiment described with reference to FIGS. 1 to 3, but employs a wave like pattern of protruding elements 32 instead of a diamond array. The protruding elements 32 include a flat front section 34 and outwardly protruding portions 38a, 38b, and 38c that project outward from flat walls sections 40. The flat wall sections 40 are generally coplanar with the lower insertion sections 42. The divider 30 also upwardly extending flanges 43. An upper tube 44 is also integrally formed on the top of the divider 30 as in the preceding embodiment.

Referring now to FIG. 5 there is illustrated another embodiment of the divider of invention, generally designated by reference numeral 50. The divider 50 includes a lower insertion section 52, outward flanges 54, and an upper tube 56. The intermediate strengthening section 58 is formed in a modified pattern having raised angle sections 60. The sections 60 have a flat surface 62 offset from the flat wall portion 64 of intermediate section 58. The connecting sections 66 connect the flat surface 62 to the wall portion 64. The embodiments of FIGS. 5 and 6 both can be formed from a plastic, such as by extrusion of a polyethylene material.

What is claimed:

1. A landscaping divider comprising a unitary body having a lower generally flat insertion section arranged in a first plane for insertion into the ground and a upper portion having a reinforced wall section and an enlarged upper horizontal section, said reinforced wall section having a plurality of raised portions projecting outward and forming a plurality of flat exposed surfaces, said flat surfaces lying in a second plane generally parallel to said reinforced wall section and lying parallel to said first plane in offset relationship, and said flat surfaces vertically extend substantially the height of said reinforced wall section.

2. The divider according to claim 1 wherein said plurality of flat exposed surfaces each have generally diamond configuration.

3. The divider according to claim 2 wherein said plurality of flat exposed surfaces are interconnected to each other in a generally wave-like form.

4. The divider according to claim 1 wherein said plurality of flat exposed surfaces include angularly arranged sections.

5. The divider according to claim 1 wherein said flat exposed surfaces are interconnected with said vertical wall sections by wall section angularly projecting from said vertical wall section.

* * * * *